US006131260A

United States Patent [19]

Catt

[11] Patent Number: 6,131,260

[45] Date of Patent: Oct. 17, 2000

[54] SELF-FEEDING, SCREENING INSTALLATION TOOL

[76] Inventor: David Leroy Catt, P.O. Box 3523, Kingman, Ariz. 86402

[21] Appl. No.: 09/136,534

[22] Filed: Aug. 19, 1998

[51] Int. Cl.[7] ...................... B23P 19/02

[52] U.S. Cl. ...................... 29/235

[58] Field of Search ...................... 29/235, 450, 451; 404/87, 74

[56] References Cited

U.S. PATENT DOCUMENTS

| | | |
|---|---|---|
| 739,342 | 9/1903 | Peregrine . |
| 2,638,131 | 5/1953 | Rohs . |
| 3,828,832 | 8/1974 | Hartman . |
| 4,005,737 | 2/1977 | Nason . |
| 4,241,487 | 12/1980 | Kraver . |
| 4,899,429 | 2/1990 | Londono . |
| 4,910,821 | 3/1990 | Kieferle . |
| 5,052,093 | 10/1991 | Urlacher . |
| 5,127,143 | 7/1992 | Urlacher . |

*Primary Examiner*—Robert C. Watson
*Attorney, Agent, or Firm*—John D. Gugliotta

[57] ABSTRACT

An improved, self-feeding, screening installation tool is disclosed, comprising a main body of generally oval configuration, with an integral handle portion configured to be used as a handle. Two generally cylindrical discs are rotatably affixed to the anterior and posterior portions of the main body. A spool holding assembly is located at the end of an extension arm that extends outward and upward from the upper anterior portion of the main body. The spool holding assembly is designed to hold a traditional cylindrically configured spool of spline. With the spool installed, the spline material is threaded through the main body, under the handle portion, and around the discs, which are used to force the material into the screen frame channel. This allows the user to simply run the discs of the present invention in the screen frame channels, automatically feeding the spline into the channel. Another embodiment discloses an elongated design with a spline spool being mounted directly to two extension arms, extending upward and outward from near the posterior of the present invention, and a spline guidance tube guiding the spline to the anterior disc.

10 Claims, 7 Drawing Sheets

SELF-FEEDING, SCREENING INSTALLATION TOOL

RELATED APPLICATIONS

The present invention is a continuation of Disclosure Document Number 426,668 filed on Oct. 10, 1997.

BACKGROUND OF THE INVENTION

1. Field of the Invention

The present invention relates generally to screen installation devices, and, more particularly, to an improved, self-feeding, screening installation tool.

2. Description of the Related Art

Window fabricators, professional window installers, and do-it-yourselfers all find themselves in a situation that calls for them to seat an elongated flexible spline within the narrow channels located in a window frame for securing a flexible screen thereto. Until now, screen installation tools have been used in conjunction with the flexible spline material, requiring the user to hand feed the material while securing it to the frame with the roller. While this practice is effective, it requires substantial concentration and coordination of the device with the spool of material, taking both skill and practice to be effective.

In the related art, several devices have been disclosed that attempt to simplify and expedite the task of installing a screen into a frame of a window or door.

U.S. Pat. No. 739,342, issued in the name of Peregrine, discloses a device for securing a screen to a frame by forcing a retaining bead strip on top of the screen and into grooves in the frame. The device consists of a long, slightly curved handle with a disk or wheel attached to each end via forked bearing. The wheels are of a thickness such that they will fit into the retaining grooves. The curvature of the handle is such that leverage is achieved by placing one end over the user's shoulder while holding the other end.

U.S. Pat. No. 4,910,821, issued in the name of Kieferle, discloses a device for securing a screen to a frame by forcing a retaining bead strip on top of the screen and into a groove in the frame. The device consists of a handle with a disk or wheel attached to one end and a retractable-blade utility knife at the other end. The wheel is of a thickness such that it will fit into the retaining groove.

U.S. Pat. No. 4,899,429, issued in the name of Londono, discloses a device for securing a screen to a frame by forcing a retaining bead strip on top of the screen and into a groove in the frame. The device consists of a handled frame that houses a front disk and a rear disc. When sliding the tool along the frame, the front disk forces the screen material into the groove and the rear disk inserts the retaining bead material.

U.S. Pat. No. 4,241,487, issued in the name of Kraver, discloses a device for securing a screen to a frame by forcing a retaining bead strip on top of the screen and into a groove in the frame. The one-piece molded device consists of a handle having round, disk shaped ends. While sliding the tool along the frame, the disk forces the screen material and the retaining bead material into the groove.

Several patents disclose devices wherein motor-driven or manually operated table mounted devices for securing a screen to a frame by forcing a retaining bead strip on top of the screen and into a groove in the frame. These devices either attach to a table via clamps or are integrated into a table-like frame, and include U.S. Pat. No. 2,638,131, issued in the name of Rohs, U.S. Pat. No. 3,828,832, issued in the name of Hartman, U.S. Pat. No. 4,005,737, issued in the name of Nason, U.S. Pat. No. 5,052,093, issued in the name of Urlacher, and U.S. Pat. No. 5,127,143, issued in the name of Urlacher.

While many of the devices of the prior art simplify the task of inserting a bead or spline, into the groove on the frame, the problem of handling the bead or spline with the opposite hand subject to insertion into the groove still exists.

A search of the prior art did not disclose any patents that read directly on the claims of the instant invention. Consequently, a need has been felt for providing an apparatus and method which overcomes the problems cited above.

SUMMARY OF THE INVENTION

It is therefore an object of the present invention to provide an improved, self-feeding, screening installation tool that simplifies and expedites the task of connecting a screen to a frame by utilizing dual disk spline insertion tool with an integral spool holding assembly upon which the spline material is stored.

Briefly described according to one embodiment of the present invention, an improved, self-feeding, screening installation tool is disclosed, comprising a main body of generally oval configuration, with an integral handle portion configured to be used as a handle. Two generally cylindrical disks are rotatably affixed to the anterior and posterior portions of the main body. A spool holding assembly is located at the end of an extension arm, which extends outward and upward from the upper anterior portion of the main body. The spool holding assembly is designed to hold a traditional cylindrically configured spool of spline. With the spool installed, the spline material is threaded through the main body, under the handle portion, and around the disks used to force the material into the screen frame channel. This allows the user to simply run the disks of the present invention in the screen frame channels, automatically feeding the spline into the channel. The present invention is comprised of a material selected from the group comprising of metal, rubber and plastic.

It is another object of the present invention to provide for a device that allows one handed attachment of a screen to a screen frame, thus eliminating the need for manual feeding of the spline under the disks of the present invention.

It is another object of the present invention to provide for device that is easy to use.

It is another object of the present invention to provide for a device that is light weight.

It is another object of the present invention to provide for a device that can utilize either or both of two disks to insert the splines into the frame channel.

DESCRIPTIVE KEY

10 an improved, self-feeding, screening installation tool
20 main body
30 handle portion
40 anterior disc slot
50 posterior disc slot
60 spline
65 anterior disc
70 screen frame channel
75 posterior disc
80 belt attachment means
90 extension arm
100 spool holding assembly

110 assembly housing
120 spool protrusion
125 spool hole
130 external thread
140 removeable end
150 removeable end hole
160 spool securement means
170 spline orifice
180 spool
190 first spline channel
200 first spline channel entrance
210 first spline channel exit
220 second spline channel
230 second spline channel entrance
240 second spline channel exit
250 grippable material
260 hand guard
270 anterior fork
280 posterior fork
290 spline channel
295 spline channel exit
300 spline guidance tube
305 extension arm hole
310 spool attachment means

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, it is essential that some description be given to the manner and practice of functional utility and description of an improved, self-feeding, screening installation tool 10.

The best mode for carrying out the invention is presented in terms of its preferred embodiment, herein depicted within the FIGS. 1 through 7.

1. Detailed Description of the Figures

Figure 1:
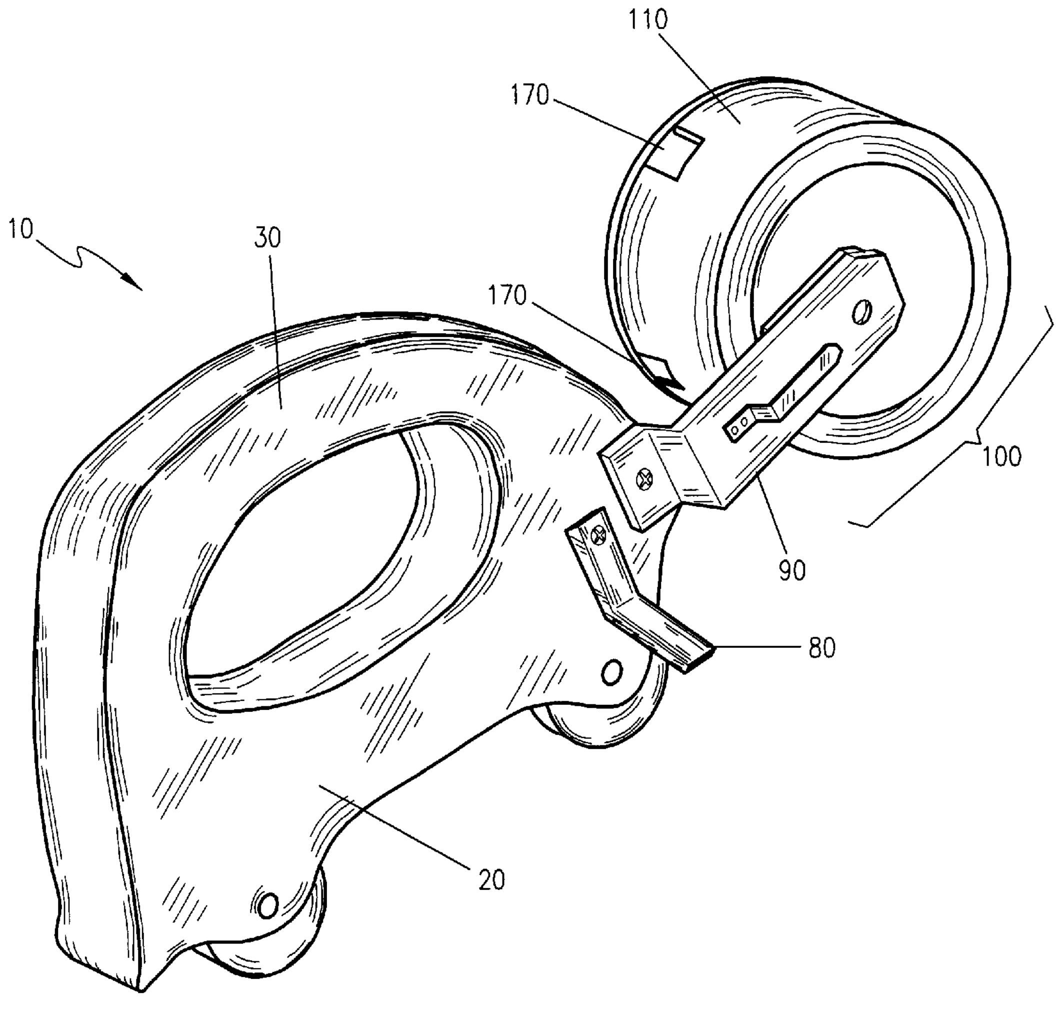
FIG. 1 is a left side perspective view of a preferred embodiment of an improved, self-feeding, screening installation tool 10.

Referring now to FIG. 1, an improved, self-feeding, screening installation tool 10 is shown, according to the present invention, comprises a main body 20 of generally elongated elliptical configuration, with an integral handle portion 30 located on the upper portion of the main body 20 and configured to be used as a handle. It is envisioned that the main body 20 be constructed from a strong, lightweight material, such as wood, metal or plastic.

Figure 2:
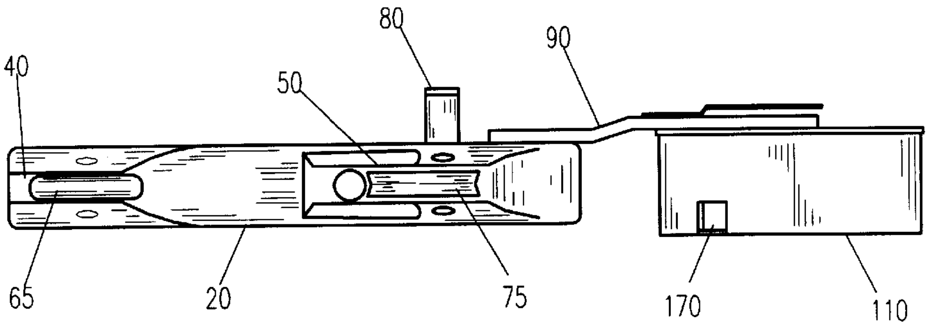
FIG. 2 is a bottom view thereof.

Referring now to FIG. 2, located at the anterior and posterior portions of the bottom of the main body 20 are an anterior disc slot 40 and posterior disc slot 50, respectively. Each disc slot is of a generally vertically elongated, rectangular configuration, with lateral width slightly greater than the width of discs traditionally used in the field of screen spline 60 application.

Figure 3:
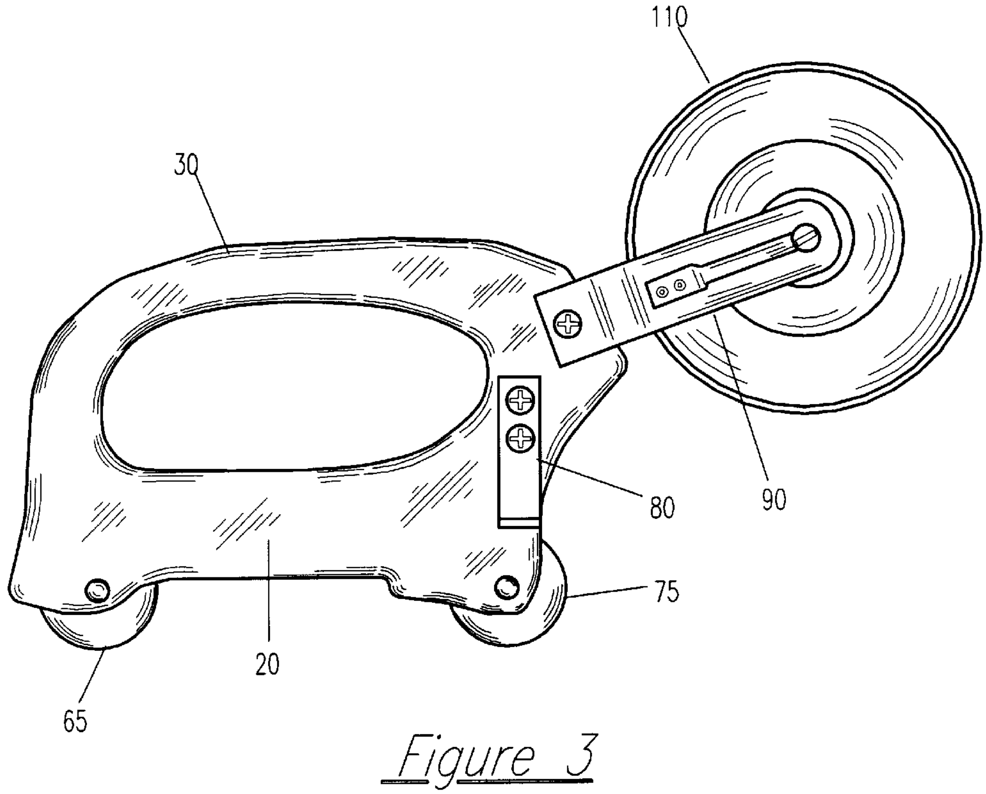
FIG. 3 is a left side, view thereof.
Figure 4:
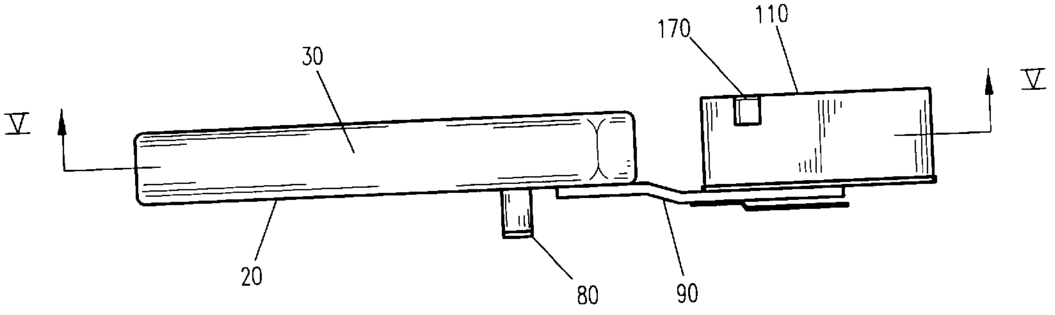
FIG. 4 is a top view thereof.

Referring now to FIGS. 1, 3 & 4, an anterior disc 65, of generally cylindrical configuration is rotatably affixed to the lower anterior portion of the main body 20. The anterior disc 65 edge is convex, extending from the bottom of the main body 20, and is sized to fit within a screen frame channel 70 (not shown). The anterior disc 65 is positioned so as to rotate in an arc of 360 degrees in a vertical plane that is parallel to the elongated centerline of the main body 20, and is positioned in a vertical plane that intersects the lateral midpoint of the main body 20. The anterior disc 65 protrudes slightly downward from the anterior disc slot 40.

A posterior disc 75, of generally cylindrical configuration is rotatably affixed to the lower posterior portion of the main body 20. The posterior disc 75 edge is concave, extending from the bottom of the main body 20, and is sized to fit within a screen frame channel 70 (not shown). The posterior disc is positioned so as to rotate in an arc of 360 degrees in a vertical plane that is parallel to the elongated centerline of the main body 20, and is positioned in a vertical plane that intersects the lateral midpoint of the main body 20. The posterior disc 75 protrudes slightly downward and posteriorly outward from the posterior disc slot 50.

A belt attachment means 80, of a generally elongated rectangular configuration, extends outward and downward from one side of the main body 20, near the posterior disc 75, and is configured to allow attachment of the main body 20 to a belt of a user.

Referring now to FIGS. 3 & 4, an extension arm 90, of generally rectangular configuration, extends outward and upward from the upper portion of one side of the main body 20, at the posterior of the main body 20. Attached in a stationary position to the end of the extension arm 90, opposite the main body 20, on the same side of the extension arm 90 as the main body 20, is a spool holding assembly 100.

The spool holding assembly 100 consists of an assembly housing 110, of a generally hollow, laterally (when in use) linearly elongated cylindrical configuration, immovably attached to the extension arm 90 at the radial center of the assembly housing 110. The lateral linear length of the assembly housing 110, along the radial centerline, is of sufficient distance such that a traditional spool 180 of spline 60, positioned with its radial centerline in linearly alignment with the radial centerline of the assembly housing 110, can rest completely within the assembly housing 110.

Located at the radial center of the assembly housing 110, and extending through the main body 20 along the radial centerline, is a spool protrusion 120, of generally linearly elongated cylindrical configuration. The cross section diameter of the spool protrusion 120 is less than the cross sectional diameter of the spool hole 125 located at the radial center of a traditional spool 180 of spline 60. The end of the spool protrusion 120, opposite the extension arm 90, has external threads 130.

Figure 5A:
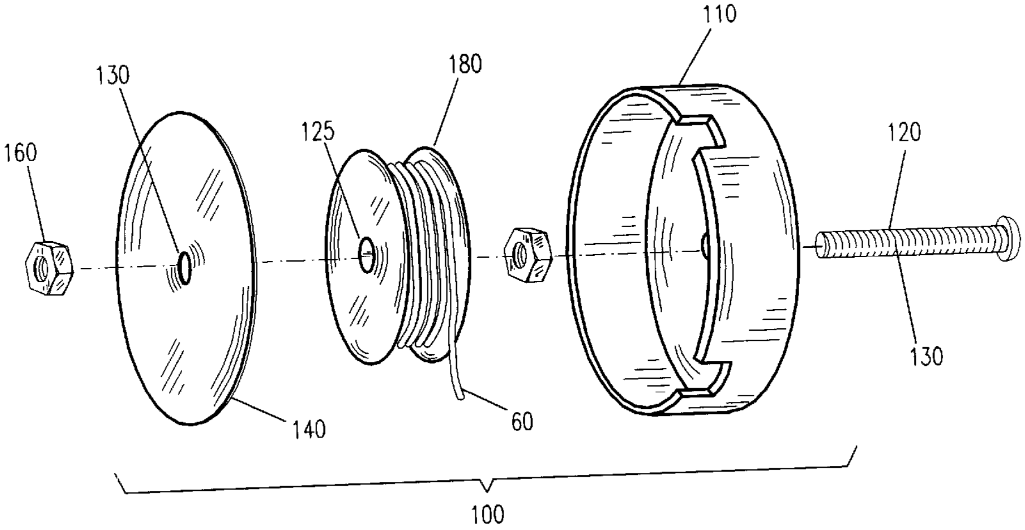
FIG. 5*a* is a right side, exploded view thereof.

Referring now to FIG. 5*a*, the removable end 140 of the assembly housing 110, opposite the extension arm 90, is of a generally circular configuration, with a removable end hole 150 located at the radial center of the removable end 140.

The removable end hole 150 is configured such that the spool protrusion 120 can be slidable inserted through the removable end hole 150. The removable end 140 is removably affixed to the remainder of the assembly housing 110 via a spool securement means 160, such as a nut, which attaches to the external threads 130 in the spool protrusion 120 that has passed through the removable end hole 150.

Figure 5B:
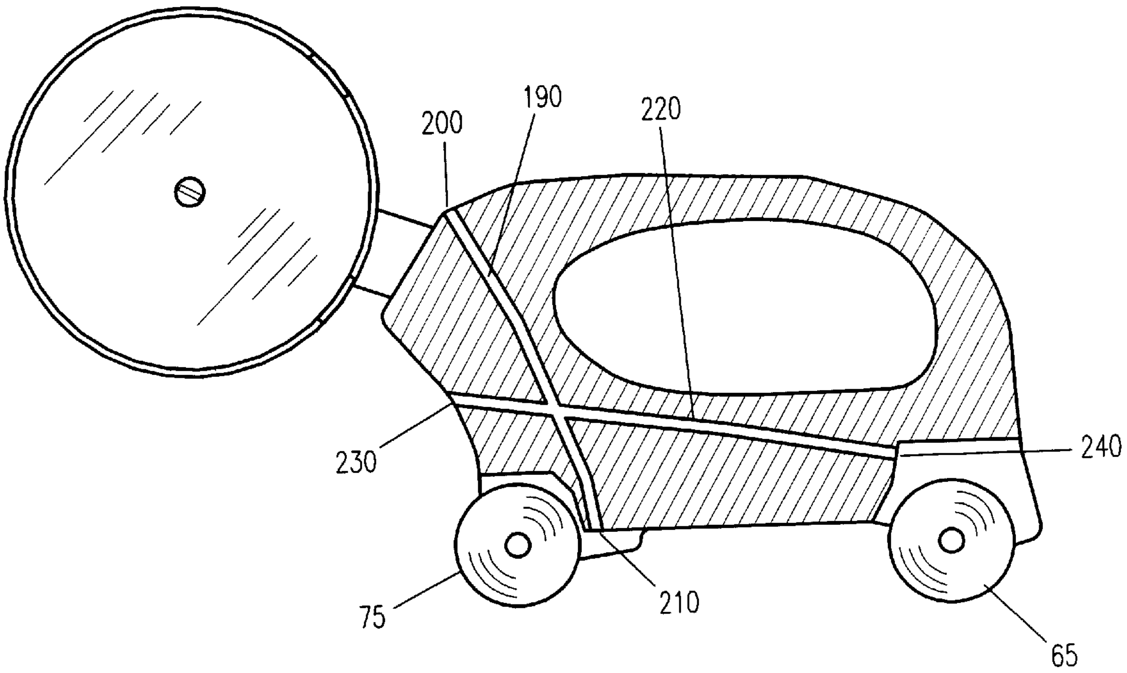
FIG. 5*b* is a right side, cross sectional view thereof, cut along lines V—V.
Figure 6:
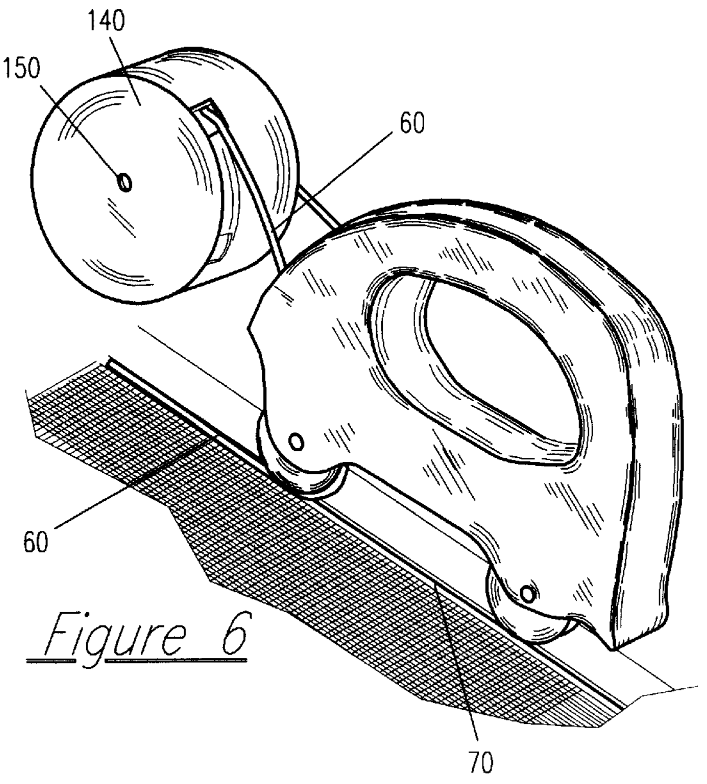
FIG. 6 is a perspective, in use view thereof using the posterior disc.
Figure 7:
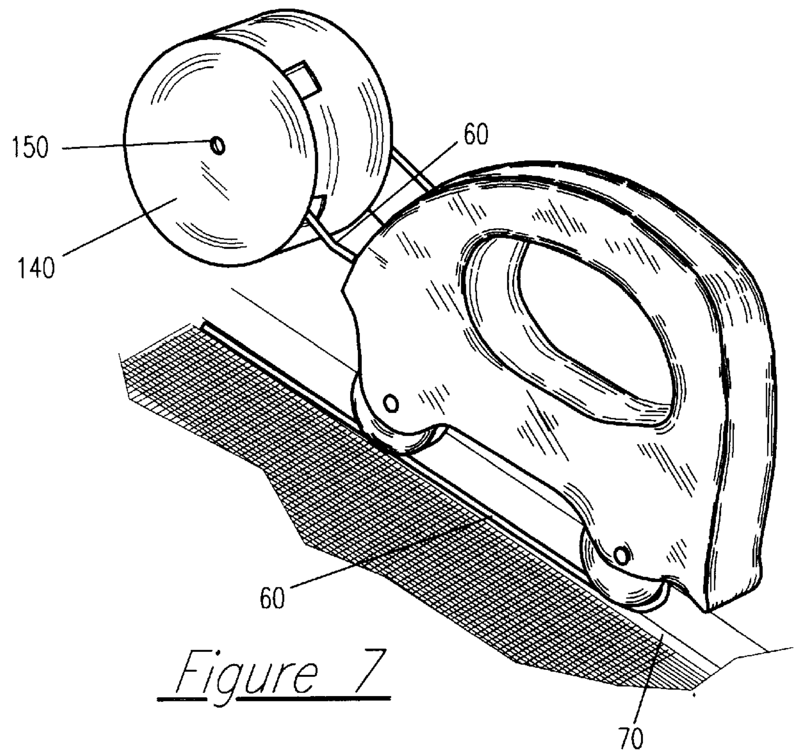
FIG. 7 is a perspective, in use view thereof using the anterior disc.
Figure 8:
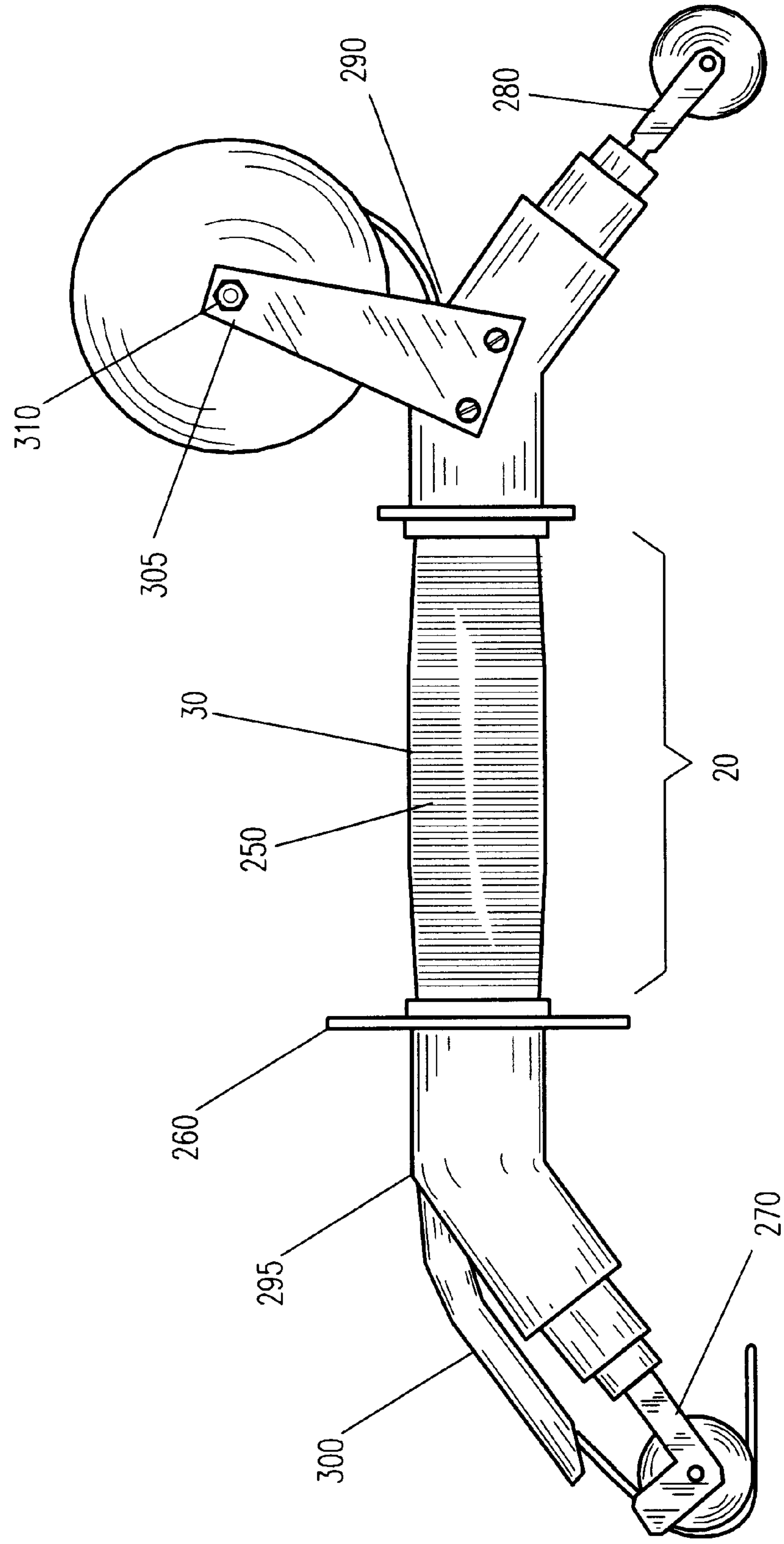
FIG. 8 is a perspective view of an alternate embodiment of the present invention.
Figure 9:
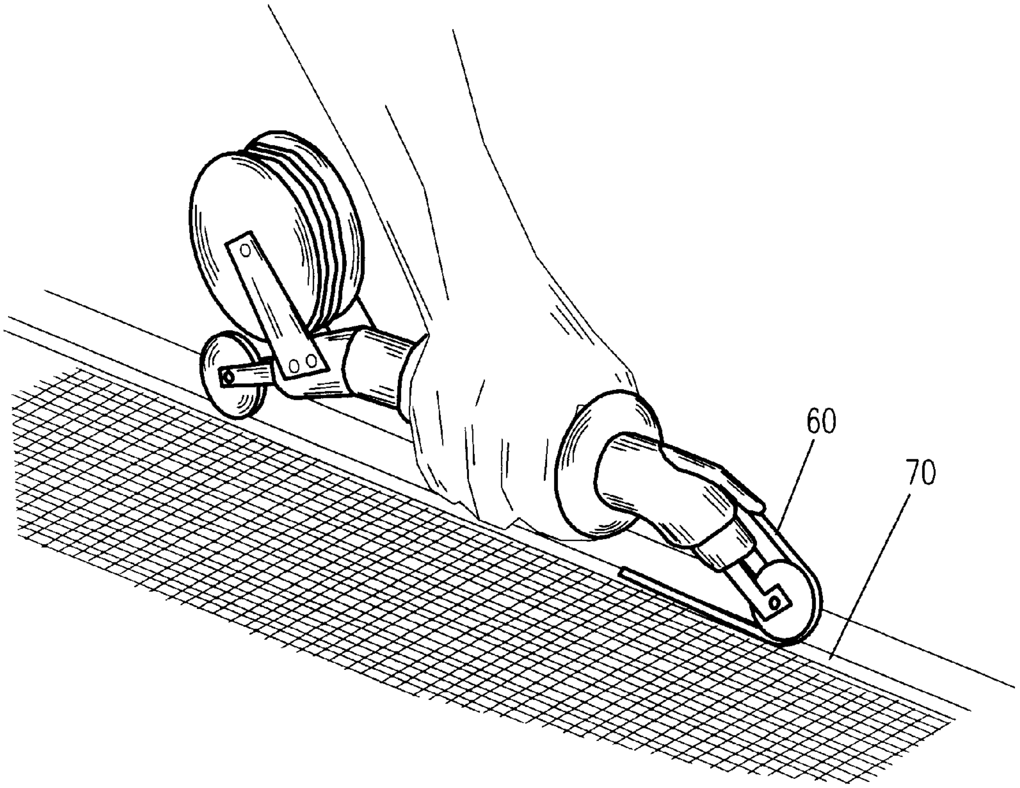
FIG. 9 is an in use, perspective view thereof.

Referring now to FIG. 5*b*, two spline orifices 170, of generally square configuration, are located along the exterior circumferential surface area of the assembly housing 110, one slightly above the extension arm 90 and the other located slightly below the extension arm 90.

The spool holding assembly 100 is designed to hold a traditional cylindrically configured spool 180 of spline 60, permitting the spool 180 to rotate in a vertical plane that is parallel to the elongated centerline of the main body 20, said spool 180 rotating along an arc of 360 degrees.

A first spline channel 190 passes generally vertically through the main body 20, extending from a first spline channel entrance 200, positioned on the main body 20 above the attachment point of the extension arm 90, through the main body 20, below the handle portion 30, to a first spline channel exit 210, located on the upper surface of the posterior disc slot 50. Each of the first spline channel entrance 200 and the first spline channel exit 210 are located at the lateral midpoint of the main body 20, in the same vertical plane as the anterior disc 65.

Sufficient space is provided between the posterior disc 75 and the side walls of the posterior disc slot 50 to permit spline 60 to pass between the upper surface of the posterior disc slot 50 and the exterior circumferential surface area of the posterior disc 75, but not allowing the spline 60 to move laterally off the exterior circumferential surface of the posterior disc 75.

A second spline channel 220 passes generally horizontally through the main body 20, extending from a second spline channel entrance 230, positioned on the posterior surface of main body 20, above the attachment point of the posterior disc 75, through the main body 20, below the handle portion 30, to a second spline channel exit 240, located on the bottom of the main body 20, above the anterior disc 65, at the lateral midpoint of the main body 20.

Sufficient space is provided between the anterior disc 65 and the side walls of the anterior disc slot 40 to permit spline 60 to pass between the upper surface of the anterior disc slot 40 and the exterior circumferential surface area of the anterior disc 65, but not allowing the spline 60 to move laterally off the exterior circumferential surface of the anterior disc 65.

With the spool 180 installed, the spline 60 material is threaded through either the first spline channel 190 or second spline channel 220, depending upon which disc is desired to be used to insert the spline 60 into the screen frame channel 70. As such, the spline 60 is inserted into the main body 20, passing under the handle portion 30, and around the disc used to force the spline 60 into the screen frame channel 70. This allows the user to simply run the discs of the present invention in the screen frame channel 70*s*, with the present invention automatically feeding the spline 60 into the channel.

It is envisioned that other styles and configurations of the main body 20, discs and the spool holding assembly 100 can be easily incorporated into the teachings of the present invention, and only two particular configurations shall be shown and described for purposes of clarity and disclosure and not by way of limitation of scope.

It is envisioned that the anterior disc 65, posterior disc 75, belt attachment means 80, extension arm 90 and spool holding assembly 100 be constructed of a strong, lightweight material, such as metal or plastic.

In another embodiment of the present invention, the main body 20 is of a generally elongated, curved cylindrical configuration, with an elongated centerline taking on an arched configuration. The middle portion of the main body 20 is used as the handle portion 30, and is designed to be gripped in a fist-like fashion by the user. A grippable material 250, such as rubber, is located on the handle portion 30.

Located along the main body 20, anterior to the handle portion 30, is a hand guard 260, of generally circular configuration. The hand guard 260 extends outward from the radial center of the main body 20, in a vertical plane that is perpendicular to the radial centerline of the main body 20, so as to stop a hand from moving forward on the main body 20 during use.

Extending outward and downward from the anterior end of the main body 20 are two anterior fork 270*s*, of generally rectangular, L-shaped configurations, positioned parallel to one another. The anterior disc 65 is rotatably connected near the ends of the forks, at the connection point of the two portions of the L-configuration, opposite the main body 20, such that the anterior disc 65 rotates in the vertical plane along the elongated centerline of the main body 20. The top portion of the anterior fork 270*s* extend outward beyond the radial diameter of the anterior disc 65, such that the top portions of the anterior fork 270*s* restrict lateral movement of the spline 60 to the exterior circumferential surface of the anterior disc 65.

Extending outward and downward from the posterior end of the main body 20 are two posterior fork 280*s*, of generally rectangular configuration, positioned parallel to one another. The posterior disc 75 is rotatably connected near the ends of the forks, opposite the main body 20, such that the posterior disc 75 rotates in the vertical plane along the elongated centerline of the main body 20.

Only one spline channel 290 is used in the alternate embodiment, and extends from the spline 60 channel entrance at the posterior of the main body 20 to spline channel exit 295 at the anterior portion of the main body 20, just above the anterior fork 270*s*.

A spline guidance tube 300 of generally linearly elongated cylindrical configuration, is placed through the spline 60 channel, extending outward from the spline channel exit 295, secured to the upper surface of the main body 20, extending to a point immediately above the anterior disc 65, so as to guide the spline 60 onto the exterior circumferential surface of the anterior disc 65.

Two extension arm 90*s* extend outward and upward from the sides of the main body 20, near the posterior end of the main body 20. The extension arm 90*s* are of generally rectangular configuration positioned in the vertical plane, parallel to one another.

A traditional spool 180 of spline 60 is rotatably affixed along its radial centerline to the two extension arm 90*s*, via two extension arm holes 305, located near the end of the extension arm 90, opposite the main body 20. Attachment is achieved via spool attachment means 310, as is known in the manufacturing community, such as a linearly elongated, cylindrical rotation bar and cotter pin combination.

2. Operation of the Preferred Embodiment

To use the preferred embodiment of the present invention, the operator places the spline 60 spool 180 on the spool holding assembly 100. If the operator wishes to use the posterior disc 75, the operator passes the spline 60 through the upper spline orifice 170, into the first spline channel entrance 200, through the first spline channel 190 and out the first spline channel exit 210. Next, the operator places the spline 60 between the posterior disc 75 and the screen frame channel 70 and presses down on the handle portion 30, running the posterior disc 75 through the screen frame channel 70.

If the operator wishes to use the anterior disc 65, the operator places the spline 60 spool 180 on the spool holding assembly 100, and then passes the spline 60 through the lower spline orifice 170, into the second spline channel entrance 230, through the second spline channel 220 and out the second spline exit 240. Next, the operator places the spline 60 between the anterior disc 65 and the screen frame channel 70 and presses down on the handle portion 30, running the anterior disc 65 through the screen frame channel 70.

To use the alternate embodiment of the present invention, the operator places the spool 180 on the extension arm 90s, runs the spline 60 through the spline guidance tube 300. Next, the operator places the spline 60 between the anterior disc 65 and the screen frame channel 70 and presses down on the handle portion, running the anterior disc 65 through the screen frame channel 70.

The foregoing description is included to illustrate the operation of the preferred embodiment and is not meant to limit the scope of the invention. The scope of the invention is to be limited only by the following claims.

What is claimed is:

1. An improved, self-feeding, screening installation tool, said screen installation tool comprising:

a main body of generally elongated elliptical configuration, with an integral handle portion located on the upper portion of said main body and configured to be used as a handle;

an anterior disc slot, located at the anterior portion of the bottom of said main body, said anterior disc slot being of a generally vertically elongated, rectangular configuration, with lateral width slightly greater than the width of discs traditionally used in the field of screen spline application;

a posterior disc slot, located at the posterior portion of the bottom of said main body, said posterior disc slot being of a generally vertically elongated, rectangular configuration, with lateral width slightly greater than the width of discs traditionally used in the field of screen spline application;

an anterior disc, of generally cylindrical configuration, said anterior disc rotatably affixed to the lower anterior portion of said main body and protruding slightly downward from said anterior disc slot;

a posterior disc, of generally cylindrical configuration, said posterior disc rotatably affixed to the lower posterior portion of said main body and protruding slightly downward and posteriorly outward from said posterior disc slot;

a belt attachment means, of a generally elongated rectangular configuration, said belt attachment means extending outward and downward from one side of said main body, near said posterior disc, and configured to allow attachment of said main body to a belt of a user;

an extension arm, of generally rectangular configuration, having two ends, said extension arm extending outward and upward from the upper portion of one side of said main body, at the posterior of said main body;

a spool holding assembly, attached to the end of said extension arm, opposite said main body, said spool holding assembly designed to house a spool of spline used to secure screen to a screen frame channel;

a first spline channel, running completely through said main body, below said handle portion, said first spline channel designed as a conduit for said spline from said spool holding assembly to said posterior disc; and a second spline channel, running completely through said main body, below said handle portion, said first spline channel designed as a conduit for said spline from said spool holding assembly to said anterior disc.

2. The screen installation tool described in claim 1 wherein said spool holding assembly is attached in a stationary position to the end of said extension arm, opposite said main body, on the same side of said extension arm as said main body, said spool holding assembly further comprising:

an assembly housing, of a generally hollow, linearly elongated cylindrical configuration, immovably attached to said extension arm at the radial center of said assembly housing; the linear length of said assembly housing, along its radial centerline, being of sufficient distance such that a spool of spline, positioned with its radial centerline in linearly alignment with the radial centerline of said assembly housing, can rest completely within said assembly housing;

a spool protrusion, of a generally linearly elongated cylindrical configuration, said spool protrusion located at the radial center of said assembly housing, and extending through said main body along the radial centerline of said assembly housing;

external threads, located on the end of said spool protrusion, opposite said assembly housing;

a removable end of said assembly housing, of round configuration, located opposite said extension arm, and having a removable end hole at the radial center, said removable end hole configured such that said spool protrusion can be slidable inserted through said removable end hole;

a spool securement means, designed to attach to said external threads on said spool protrusion so as to removably affix said removable end to said assembly housing; and two spline orifices, of generally square configuration, located along the exterior circumferential surface area of said assembly housing, one slightly above said extension arm and the other located slightly below said extension arm.

3. The spool holding assembly described in claim 2, wherein said spool holding assembly is designed to hold a cylindrically configured spool of spline, permitting said spool to rotate in a vertical plane that is parallel to the elongated centerline of said main body, said spool rotating along an arc of 360 degrees.

4. The screen installation tool described in claim 1, wherein said first spline channel passes generally vertically through said main body, extending from a first spline channel entrance, positioned on said main body above the attachment point of said extension arm, through said main body, below said handle portion, to a first spline channel exit, located on the upper surface of said posterior disc slot.

5. The screen installation tool described in claim 1, wherein sufficient space is provided between said posterior disc and the side walls of said posterior disc slot to permit spline to pass between the upper surface of said posterior disc slot and the exterior circumferential surface area of said posterior disc, but not allowing said spline to move laterally off the exterior circumferential surface of said posterior disc.

6. The screen installation tool described in claim 1, wherein said second spline channel passes generally horizontally through said main body, extending from a second spline entrance, positioned on the posterior surface of main body, above said attachment point of said posterior disc, through said main body, below said handle portion, to a second spline channel exit, located on the bottom of said main body, above said anterior disc, at the lateral midpoint of said main body.

7. The screen installation tool described in claim 1, wherein sufficient space is provided between said anterior disc and the side walls of said anterior disc slot to permit spline to pass between the upper surface of said anterior disc slot and the exterior circumferential surface area of said anterior disc, but not allowing said spline to move laterally off the exterior circumferential surface of said anterior disc.

8. The screen installation tool described in claim 1, wherein said first spline channel entrance, second spline channel entrance, first spline channel exit and second spline channel exit are located at the lateral midpoint of said main body, in the same vertical plane as said anterior disc and posterior disc.

9. The screen installation tool described in claim 1, wherein an operator can position spline into a screen frame channel using only one hand, and without the necessity of guiding said spline onto said anterior disc or posterior disc or into said screen frame channel using a second hand.

10. The screen installation tool described in claim 1, wherein said anterior disc, posterior disc, belt attachment means, extension arm and spool holding assembly be constructed of a strong, lightweight material, chosen from the group comprised of metal or plastic.

* * * * *